DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 7, 1972

896 O.G. 18

T896,013

COPOLYMERS OF METHYL METHACRYLATE

Eugene P. Reilly, Wilmington, Del., assignor to E. I. du Pont de Nemours and Company, Wilmington, Del.

Filed Dec. 18, 1970, Ser. No. 99,514

Int. Cl. C08f *15/18*

U.S. Cl. 260—86.1 R

No Drawing. 9 Pages Specification

Copolymers of methyl methacrylate and 2-phenylallyl alcohol are provided wherein the copolymers are derived from between about 99% and about 99.9% by weight of methyl methacrylate and between about 0.1% and about 1% by weight of 2-phenylallyl alcohol. The copolymers have an inherent viscosity of at least 0.44 and may be molded into shaped structures such as lenses.